H. S. DEW & W. H. MINTON.
PNEUMATIC TIRE.
APPLICATION FILED JULY 31, 1914.

1,154,848.

Patented Sept. 28, 1915.

UNITED STATES PATENT OFFICE.

HUGH S. DEW, OF DE WALT, AND WILLIS H. MINTON, OF MISSOURI CITY, TEXAS.

PNEUMATIC TIRE.

1,154,848.

Specification of Letters Patent. Patented Sept. 28, 1915.

Application filed July 31, 1914. Serial No. 854,251.

*To all whom it may concern:*

Be it known that we, HUGH S. DEW and WILLIS H. MINTON, citizens of the United States, residing at De Walt and Missouri City, respectively, in the county of Fort Bend and State of Texas, have invented certain new and useful Improvements in Pneumatic Tires, of which the following is a specification.

This invention relates to new and useful improvements in pneumatic tires and particularly such tires as are used on vehicle wheels such as automobiles.

The object of the invention is to provide a pneumatic tire having the usual outer casing and inner tubing, the latter of which is protected by a surrounding intermediate sheath, preferably formed of vulcanized fiber or some other tough, flexible, impenetrable substance, which will protect the inner tubing and prevent puncture thereof.

With the above and other objects in view, the invention has particular relation to certain novel features of construction, operation and arrangement of parts, an example of which is given in this specification and illustrated in the accompanying drawings wherein:—

Figure 1:
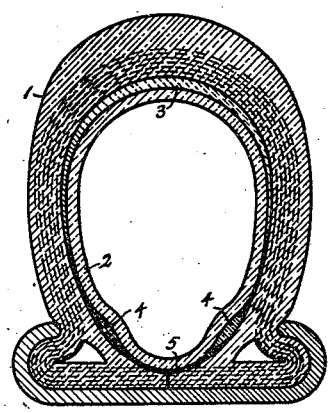
Figure 2:
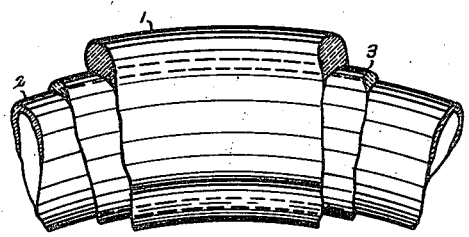
Figure 3:
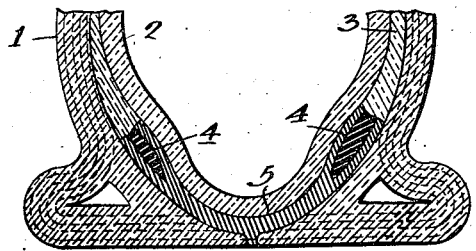

Figure 1, is a cross section of our improved tire in place on a wheel rim, and Fig. 2 is a fragmentary side elevation of the tire. Fig. 3 is an enlarged fragmentary cross sectional view of the tire.

Referring now more particularly to the drawings, wherein like numerals of reference designate similar parts, in each of the figures the numeral 1 designates the outer casing, which is constructed of rubberized fiber in the well-known manner, having a thick covering of rubber surrounding said fiber. A detailed description of this casing is not deemed necessary inasmuch as its form and construction are well known.

The numeral 2 refers to an inner inflatable tube, which is inflated by an air pump and interposed between this inner tube and the tread and sides of the casing is the sheath 3, which is preferably formed of rubberized fiber, which is practically impenetrable, and protects the inner tube against puncture. The tread portion of this sheath is of considerable thickness, but the sides taper down to a thin edge and terminate in thick, flat annular beads 4 formed of rubber or some other soft material. These beads prevent the edges of the hard sheath from wearing or cutting the inner tube 2. The beads 4 are connected by means of a flexible apron 5, formed preferably of rubber which, together with the sheath and beads completely surround and inclose the inner tube; the sheath, beads and apron are joined as to form an endless tube practically without seams, thus giving a continuous smooth surface on each side against which the inner tube and outer casing rest. The apron 5 is glued or otherwise secured to the beads 4 after the sheath 3 has been applied around the inner tube. The exposed portion of the inner tube will thus be surrounded and protected by a smooth and flexible sheath against which there will be a small amount of friction and at the same time said sheath, being practically impenetrable, will protect the inner tube against puncture.

While we have shown only one form of this invention, it is obvious that the mechanical structure thereof may be changed without departing from the principle of the invention, and we hereby reserve the right to make such modifications in the tire as will not depart from the scope of the appended claim.

What we claim is: —

A tire of the character described, including an outer casing, an inner inflatable tube, a sheath formed of flexible impenetrable material, interposed between the casing and tube and surrounding the sides and tread of said tube, the edges of said sheath terminating in resilient annular beads which form a continuation of the sheath, and a flexible apron connecting said beads, and forming with the sheath a complete envelop for the tube.

In testimony whereof we have signed our names to this specification in the presence of two subscribing witnesses.

HUGH S. DEW.
WILLIS H. MINTON.

Witnesses:
A. C. SPRINGFIELD,
J. W. WOODS.